United States Patent

Gokcen et al.

Patent Number: 5,221,570
Date of Patent: Jun. 22, 1993

[54] MULTILAYERED COEXTRUDED GEOMEMBRANE

[76] Inventors: Cem Gokcen, 3082 Castlebury Pl.; Gary Kolbasuk, 1561 Spruce, both of Galesburg, Ill. 61401

[21] Appl. No.: 753,817

[22] Filed: Sep. 3, 1991

Related U.S. Application Data

[63] Continuation-in-part of Ser. No. 557,622, Jul. 24, 1992, abandoned.

[51] Int. Cl.$^5$ .............................................. B32B 7/00
[52] U.S. Cl. .................................... 428/215; 324/557; 324/326; 428/516; 428/500; 156/244.11
[58] Field of Search ............... 428/516, 500, 215; 324/557, 326; 156/244.11

[56] References Cited

U.S. PATENT DOCUMENTS

| | | | |
|---|---|---|---|
| 3,874,987 | 4/1975 | Young | 156/306 |
| 4,053,341 | 10/1977 | Kleiner et al. | 156/79 |
| 4,324,829 | 4/1982 | Hayes | 428/215 |
| 4,357,191 | 11/1982 | Bullard et al. | 156/244.14 |
| 4,404,857 | 9/1983 | Hardison et al. | 73/827 |
| 4,514,465 | 4/1985 | Schoenberg | 428/339 |
| 4,539,259 | 9/1985 | Zuscik | 428/332 |
| 4,565,720 | 1/1986 | Yaeo et al. | 428/35 |
| 4,567,069 | 1/1986 | Jabarin | 428/35 |
| 4,657,811 | 4/1987 | Boyd et al. | 428/318.6 |
| 4,661,401 | 4/1987 | Akao | 428/215 |
| 4,678,375 | 7/1987 | Gagle et al. | 405/270 |
| 4,716,069 | 12/1987 | Burke | 428/167 |
| 4,719,407 | 1/1988 | Converse et al. | 340/605 |
| 4,720,669 | 1/1988 | Owen | 340/604 |
| 4,721,591 | 1/1988 | Cheng-Shiang | 264/54 |
| 4,725,785 | 2/1988 | Converse et al. | 340/605 |
| 4,732,635 | 3/1988 | Levens | 156/230 |
| 4,740,757 | 4/1988 | Converse et al. | 340/605 |
| 4,741,644 | 5/1988 | Cavalli et al. | 405/50 |
| 4,751,467 | 6/1988 | Cooper | 340/605 |
| 4,751,841 | 6/1988 | Biard et al. | 73/40 |
| 4,755,757 | 7/1988 | Cooper | 73/40 |
| 4,764,560 | 8/1988 | Mitchell | 524/506 |
| 4,767,653 | 8/1988 | Renstrom | 428/40 |
| 4,767,658 | 8/1988 | Lorenz | 428/192 |
| 4,784,885 | 11/1988 | Carespodi | 428/349 |
| 4,810,131 | 3/1989 | Turner | 405/129 |
| 5,139,853 | 8/1992 | Mathieson et al. | 428/516 |

*Primary Examiner*—Edith Buffalow
*Attorney, Agent, or Firm*—Niro, Scavone, Haller & Niro

[57] ABSTRACT

A multilayered coextruded geomembrane system utilized in a variety of applications including, but not limited to, landfills for the disposal of wastes, surface impoundments or ponds, heap leach pads for mining or methane barriers for building and floating covers reservoirs. The geomembrane consists of three or more polymeric layers with outside layers consisting of high density polyethylene at least 0.930 g/cm$^3$ and a very low density polyethylene inner core layer less than or equal to 0.920 g/cm$^3$. The melt index of the very low and high density polyethylene is less than 2.0 and 1.0, respectively. Each outside layer of high density polyethylene is 10 to 40% of the total geomembrane thickness. The very low density polyethylene inner core layer is 20 to 80% of the total geomembrane thickness.

10 Claims, 1 Drawing Sheet

MULTILAYERED COEXTRUDED GEOMEMBRANE

This is a continuation-in-part of copending application Ser. No. 07/557,622 filed on Jul. 24, 1990 now abandoned.

BACKGROUND OF THE INVENTION

The present invention relates generally to geomembranes and, more particularly, to a multilayered coextruded geomembrane constructed from selected polyethylene resins. The invention achieves a unique combination of performance characteristics which greatly enhances the efficacy of the geomembrane in the field.

With the ever increasing desire in recent years to protect the environment, there has arisen a demand for sheet materials which can effectively seal large landfills and hazardous material sites from the surrounding land and water. Such sheet material, commonly designated as a "geomembrane", must be strong, chemically resistant, flexible and effectively assembled into a very large continuous sheet in the field. One method of assembly now used is heat bonding of adjacent edges of the individual sheets, which are typically up to 34 feet wide and perhaps hundreds of yards in length. Therefore, weldability is also important for all types of geomembranes.

High density polyethylene geomembranes have good overall strength including seam strength and are very resistant to attack by chemicals. Limitations of high density polyethylene geomembranes include low flexibility, a functionally limited elongation range and susceptibility to stress cracking if improperly installed. On the other hand, very low density polyethylene geomembranes are much more pliable than high density polyethylene and have an excellent functional elongation range allowing the material to conform to irregular surfaces or changes in the subgrade. However, very low density polyethylene is less chemically resistant and has a lower seam strength than high density polyethylene when tested in accordance with standard seam peel and shear tests.

Accordingly, a need exists for a geomembrane sheet material which not only exhibits exceptional seam or weld strength, but also has a greater degree of flexibility and an ability to conform to irregularities in its supporting surface.

SUMMARY OF THE INVENTION

The present invention is a geomembrane sheet, a planar product manufactured with three or more layers of polymeric material that is used with soil, rock, earth or other geotechnical engineering related material as an integral part of a man-made project, structure or system and can be used as a gas or hydraulic barrier.

In accordance with the present invention, the geomembrane sheet material consists of a multilayered coextruded sheet material that has outer layers comprised of a high density polyethylene and at least one inner core layer that is comprised of a very low density polyethylene. The two outer layers each have a minimum clear resin density of 0.930 and melt index of less than 1.0. On the other hand, the very low density inner layer has a clear resin base density of less than 0.920 and a melt index of less than 2.0.

The present invention provides a geomembrane exhibiting enhanced flexibility and ease of handling and welding that is superior to both high density polyethylene and low density polyethylene. Very low density polyethylene tends to block or stick to itself, yet the coextruded multilayered geomembrane of the present invention maintains many advantages of very low density polyethylene without blocking problems in handling since the outer layers of the coextruded multilayered geomembrane are constructed of high density polyethylene which does not block. Additionally, high density polyethylene material is typically not functional after its yield point has been exceeded. Nonetheless, the geomembrane of the present invention is functional after the yield point of the high density polyethylene has been exceeded because the useful life of very low density polyethylene does not end at the yield point. As a result, the high/very low/high density composite allows the geomembrane to perform effectively with irregular subsurfaces.

The multilayered coextruded geomembrane constructed in accordance with the present invention offers exemplary seam strength which is critical to its function. The strength of a geomembrane seam is typically no stronger than the geomembrane material itself and very often much weaker. The seam strength is a function of shear and peel strength, which appraises the strength across the seam, and how well the two sheets perform when an attempt is made to peel two sheets apart on the same side of the weld. The composite geomembrane seam made with a wedge welder has a typical peel strength and shear strength of 85% and 100% of the parent material functional strength, respectively. These values are higher than those obtained for similar high density polyethylene or very low density polyethylene seams. These values are higher than values obtained of geomembrane seams constructed with a wedge welder and similar high density or very low density polyethylene along.

Polyethylene is a semi-crystalline polymer and is subject to stress cracking, the failure to the material by slow crack growth at stresses below the material's tensile strength. The higher the density of polyethylene, the poorer the stress crack resistance and high density polyethylene can stress crack under some scenarios that occur in the use of geomembranes. Conversely, stress cracking is into a problem in very low density polyethylene as long as it is a higher molecular weight polyethylene, as indicated in the present invention by the melt index of less than 2.0. Therefore, in accordance with the present a invention, the very low density polyethylene layer attenuates any stress cracks that might occur in the high density polyethylene of this multilayered coextruded geomembrane.

The multilayered coextruded geomembrane sheet material is manufactured in a variety of thicknesses depending on geomembrane application. The typical overall thickness of this geomembrane ranges from 0.030 inches to 0.100 inches, but may be as thin as 0.020 inches or as thick as 0.300 inches. Thickness ratio of the high density polyethylene material to the very low density polyethylene material depends on the relative importance of the physical or chemical characteristics or the total thickness of the sheet. Each of the outer layers of the multilayered coextruded geomembrane sheet material has a thickness of about 10% to 40% of the overall thickness of the membrane.

BRIEF DESCRIPTION O THE DRAWINGS

The novel features that are believed to be characteristic of the invention are set forth in the appended claims.

The invention, itself, however, together with further objects and advantages, will be best understood by reference to the following description taken in conjunction with the accompanying drawings in which:

FIG. 1 is a sectional view illustrating the outer and inner layers of a geomembrane sheet material constructed in accordance with the present invention; and FIG. 2 represents test results from a Multi-Axial Tension Test for Geosynthetics (more commonly referred to as the Large Scale Hydrostatic Test). Stress is plotted on the Y axis and percent strain is plotted on the X axis.

DETAILED DESCRIPTION OF THE PREFERRED EMBODIMENT

Figure 1:
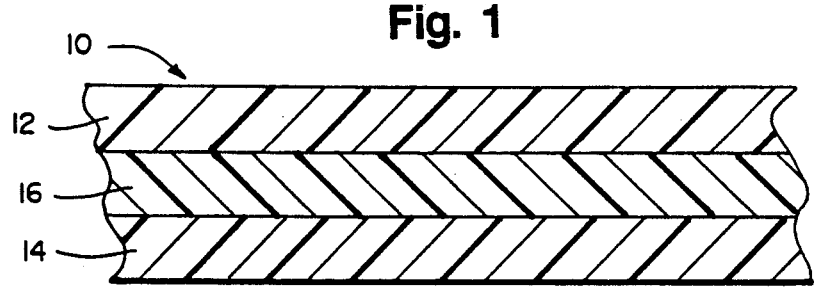

Referring now to FIG. 1, a preferred embodiment of the multilayered geomembrane sheet material is designated as 10 and includes outer layers 12 and 14, and inner layer 16. Each of the outer layers, 12 and 14, is constructed form a high density polyethylene having a clear resin base density of at least 0.930, preferably between 0.930 to 0.945, and a melt index of less than 1.0. The core layer, 16, is constructed from a very low density polyethylene having a clear resin base density of less than 0.920, preferably between 0.890 to 0.920, and a melt index of less than 2.0. Both the high density polyethylene layers and very low density polyethylene layers may contain minor amounts of other components conventionally employed by those of ordinary skill in the art in manufacturing a geomembrane. Specifically, the polyethylene layers may contain carbon black to absorb ultra-violet light, pigmentation for color, chemical processing stabilizers and aids and antioxidants for long term stabilization.

In accordance with the present invention, the multilayered high/very low/high density membrane composite may be produced by any one of the various coextrusion techniques well known to persons of ordinary skill in the art. The overall thickness of the multilayered coextruded geomembrane may range from 20 to 300 thousandths of an inch. The minimum thickness of each outer layer, 12 and 14, should be not less than about 4 thousandths of an inch in order to present migration of the inner layer(s) into the weld and thereby weakening the weld.

Preferably, the multilayered coextruded geomembrane will have very low density core layer, 16k, thickness ranging from 20% to 80% of the total geomembrane thickness. The thickness of each outer layer, 12 nd 14, is typically between 10% and 40% of the overall geomembrane thickness. Chemical resistance, seam strength, overall desired flexibility and actual density of resins used will influence the optimum relative thickness of the high and very low density polyethylenes. The ratio of thickness to optimize tensile properties depends on the relative importance of modulus, distinction of yield point and ultimate elongation and strength. Applications that require a higher modulus are best served with a very low density core layer of 20% to 50% of the overall geomembrane thickness; whereas applications that require a high extension with a non-distinct yield point are best served with a very low density core layer of 60% to 80% of overall thickness. The synergistic effect of these two density polyethylenes with respect to amount of energy required to break the material (toughness) are maximized when the very low density core layer thickness is approximately 50% to 60% of the total geomembrane.

Chemical resistance of polyethylene is a function of the density, the higher the density, the better the chemical resistance. Because the high density polyethylene is on the outside of the multilayered composite geomembrane in direct contact with chemicals, the chemical resistance of this multilayered geomembrane is primarily dictated by the high density polyethylene Strength of the multilayered coextruded membrane is dependent upon the type of strength being evaluated, which procedure is used to measure strength and which aspect of strength is of interest. Modulus and ultimate tensile strength are optimal using 100% high density polyethylene. Flexibility and ultimate tensile elongation are optimal using 100% very low density polyethylene. Hydrostatic resistance and tensile toughness are optimized when using the multilayered coextruded geomembrane constructed of 50% to 60% very low density polyethylene. Tensile elongation for high density polyethylene, very low density polyethylene and the multilayered coextruded geomembrane composite are all very high, at least 700%. Although high density polyethylene is no longer considered functional after its yield point is passed at approximately 15% tensile elongation, when the high density polyethylene is linked to the very low density polyethylene in the multilayered composite, the practical elongation limit is the same as the very low density polyethylene: the elongation at break.

Figure 2:
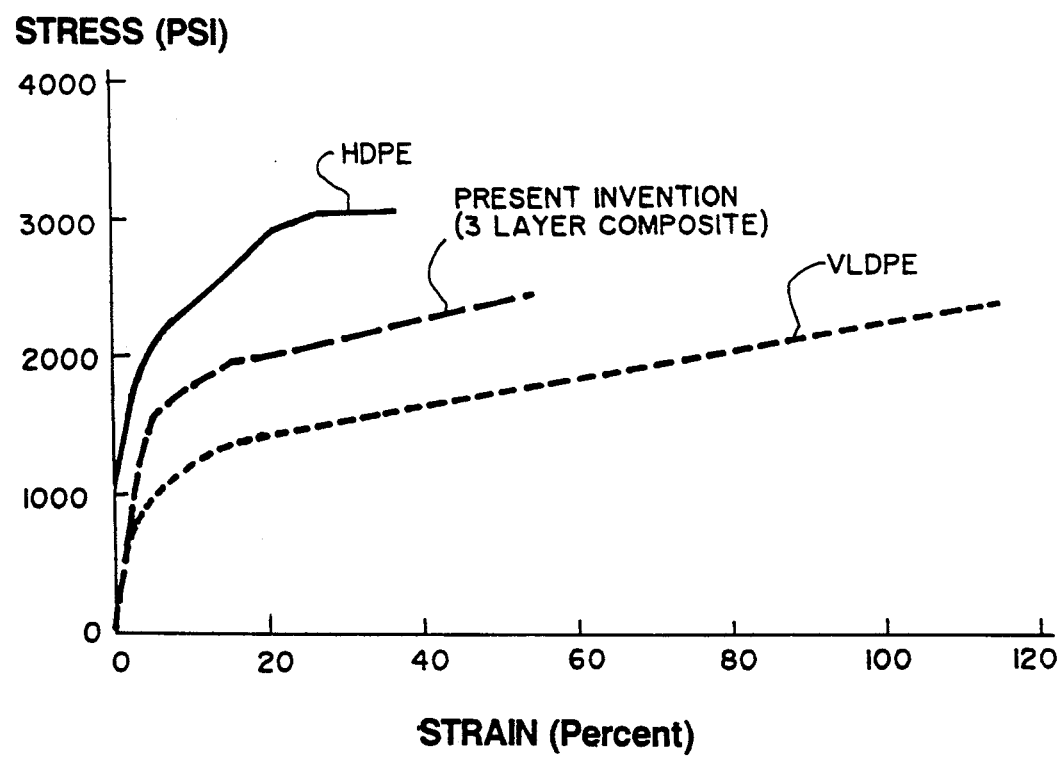

FIG. 2 shows the multi-axial tensile properties of the present invention as compared to the HDPE or VLDPE tested individually. The multi-axial tensile test simulates stresses as they occur in field applications because this type of test will simulate the movement that occurs in the geomembrane when conforming to a new surface. Unlike a normal index tensile test, the multi-axial tensile test uses a large sample of geomembrane measuring stress in multiple directions. The normal index tensile test measures stress in only one direction. FIG. 2 clearly shows the high density polyethylene lacks the elongation of the present invention. In addition, the present invention offers higher strength with adequate elongation in comparison to the very low polyethylene.

Tear resistance of the present invention varies in measure between that of the tear resistance of the high density polyethylene and the very low density polyethylene; although actual tear resistance of the composite is closer to the high density polyethylene tear resistance, which has the best resistance.

While preferred embodiments of the present invention have been illustrated and described, it will be understood that changes and modifications can be made without departing from the invention and its broader aspects. Various features of the invention are defined in the following claims.

We claim:

1. A multilayered coextruded geomembrane sheet material comprising:
   two high density polyethylene outer layers; and
   one very low density polyethylene inner core layer.

2. The multilayered coextruded geomembrane sheet material of claim 1 wherein said high density polyethylene has a clear resin base density of about 0.930 to 0.945.

3. The multilayered coextruded geomembrane sheet material of claim 1 wherein said very low density polyethylene has a clear resin base density of about 0.890 to 0.920.

4. The multilayered coextruded geomembrane sheet material of claim 1 wherein said high density polyethylene has a melt index less than 1.0.

5. The multilayered coextruded geomembrane sheet material of claim 1 wherein said very low density polyethylene has a melt index less than 2.0.

6. The multilayered coextruded geomembrane sheet material of claim 1 wherein said sheet material has an overall thickness between 20 thousandths of an inch and 300 thousandths of an inch.

7. The multilayered coextruded geomembrane sheet material of claim 1 wherein each said high density outer layer is approximately 10% to 40% of overall geomembrane thickness.

8. The multilayered coextruded geomembrane sheet material of claim 1 wherein said very low density inner core layer is 20% . to 80% of overall geomembrane thickness.

9. The multilayered coextruded geomembrane sheet material of claim 1 wherein each high density outer layer has a minimum thickness of 4 thousandths of an inch.

10. The multilayered coextruded geomembrane sheet material of claim 1 wherein one or more of said layers may include one or more of the following: carbon black, pigments, dyes, processing aids, stabilizers or other modifiers.

* * * * *

UNITED STATES PATENT AND TRADEMARK OFFICE
CERTIFICATE OF CORRECTION

PATENT NO. : 5,221,570

DATED : June 22, 1993

INVENTOR(S) : Gokcen et al

It is certified that error appears in the above-indentified patent and that said Letters Patent is hereby corrected as shown below:

On the title page
Item number (63), line 1 -"1992" should read "1990"
Column 2, line 34 - "of" should read "for"
Column 2, line 36 - "along" should read "alone"
Column 2, line 44 - "into" should read "not"
Column 2, line 48 - "a" should be removed
Column 2, line 65 - "0" should read "OF"
Column 3, line 36 -"membrane" should read "geomembrane"
Column 3, line 42 - "not" should read "no"
Column 3, line 47 - "16K" should read "16"

Signed and Sealed this

Fifth Day of October, 1993

Attest:

BRUCE LEHMAN

Attesting Officer    Commissioner of Patents and Trademarks

UNITED STATES PATENT AND TRADEMARK OFFICE
CERTIFICATE OF CORRECTION

PATENT NO. : 5,221,570
DATED : June 22, 1993
INVENTOR(S) : Gokcen, et al

It is certified that error appears in the above-indentified patent and that said Letters Patent is hereby corrected as shown below:

Column 3, line 50 - "nd" should read --and--.

Signed and Sealed this

Eighth Day of March, 1994

*Attest:*

BRUCE LEHMAN

*Attesting Officer*  *Commissioner of Patents and Trademarks*